July 7, 1936.   E. G. ROEHM ET AL   2,047,034
BROACHING MACHINE
Filed Nov. 4, 1933   6 Sheets-Sheet 1

Inventors
ERWIN G. ROEHM
MILLARD ROMAINE
By A. K. Parsons
Attorney

July 7, 1936.　　E. G. ROEHM ET AL　　2,047,034
BROACHING MACHINE
Filed Nov. 4, 1933　　6 Sheets—Sheet 2

Inventors
ERWIN G. ROEHM
MILLARD ROMAINE
By　H. K. Parsons
Attorney

Inventors
ERWIN G. ROEHM
MILLARD ROMAINE
By A. H. Parsons
Attorney

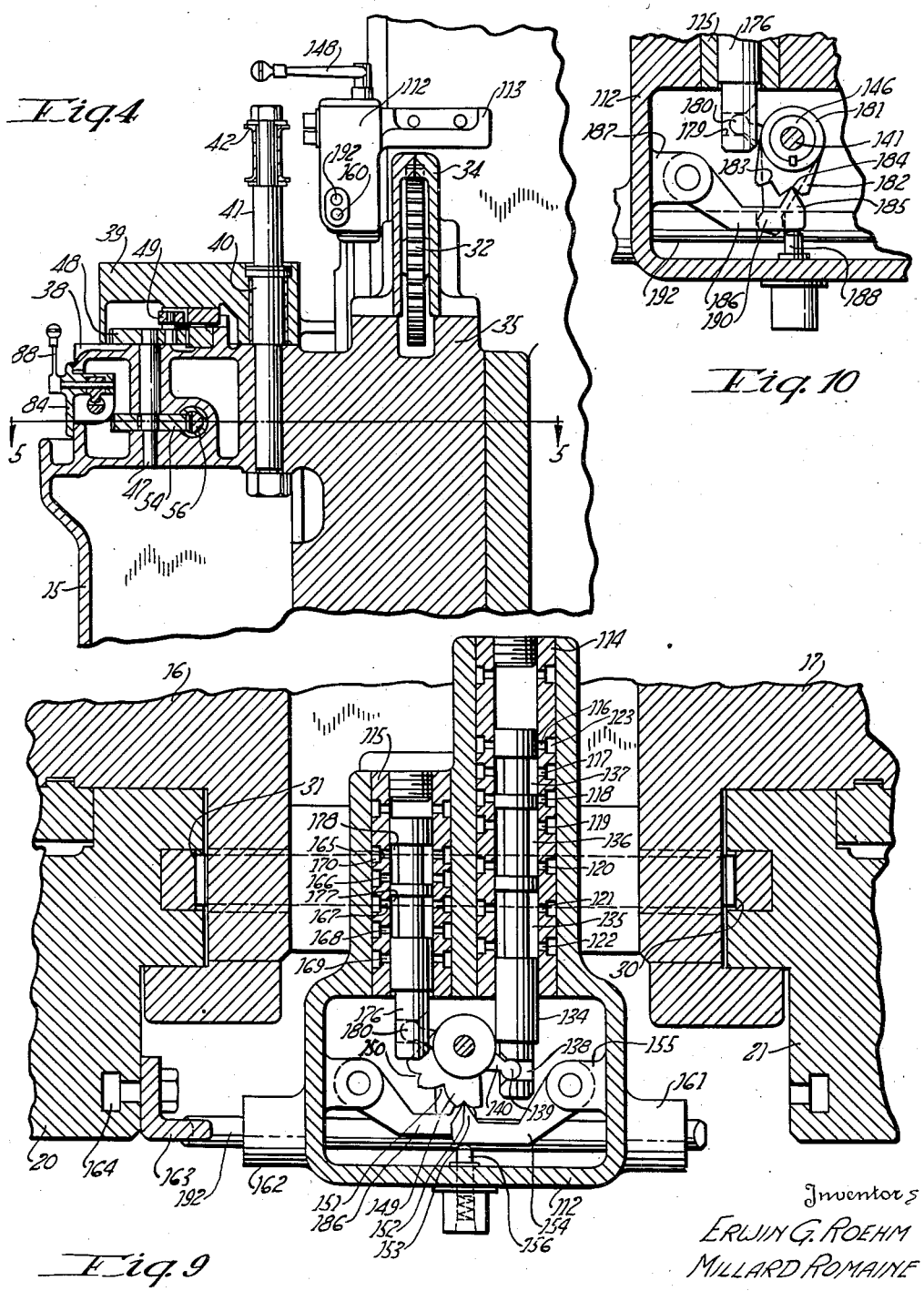

July 7, 1936.  E. G. ROEHM ET AL  2,047,034
BROACHING MACHINE
Filed Nov. 4, 1933   6 Sheets-Sheet 5
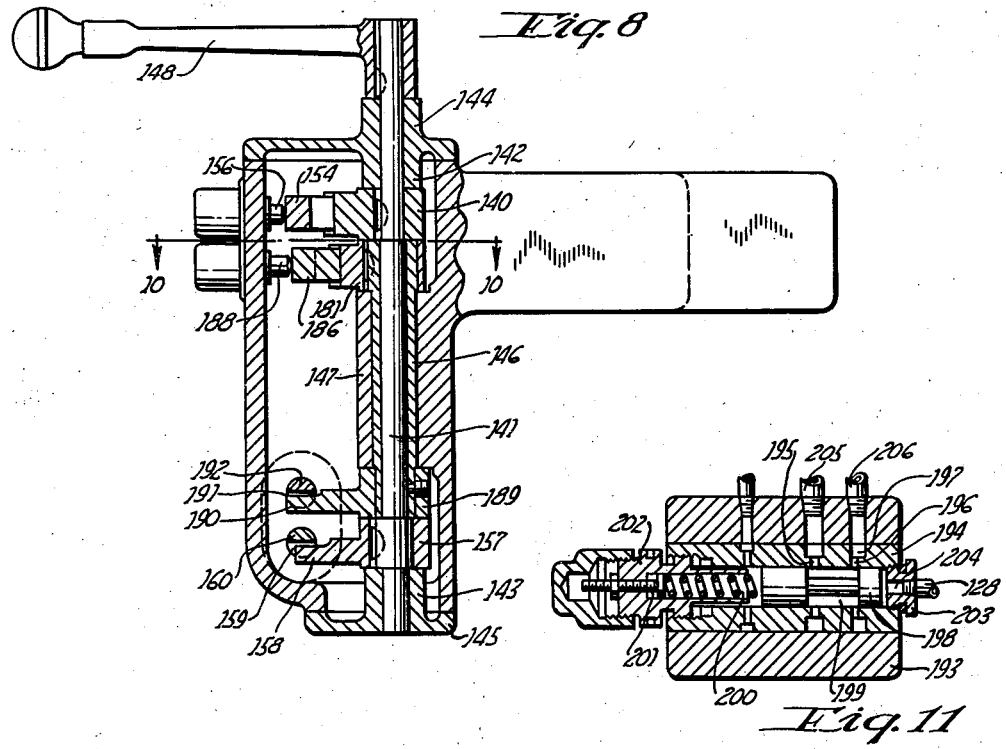
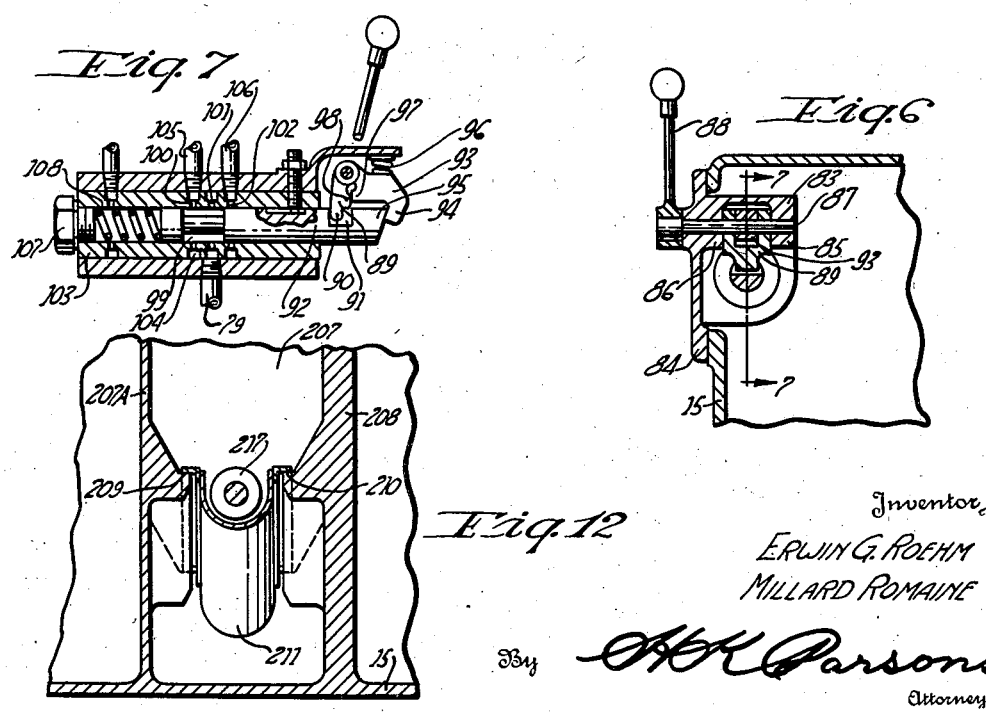
Inventors
ERWIN G. ROEHM
MILLARD ROMAINE
By H. K. Parsons
Attorney July 7, 1936.  E. G. ROEHM ET AL  2,047,034
BROACHING MACHINE
Filed Nov. 4, 1933   6 Sheets-Sheet 6
Fig. 13
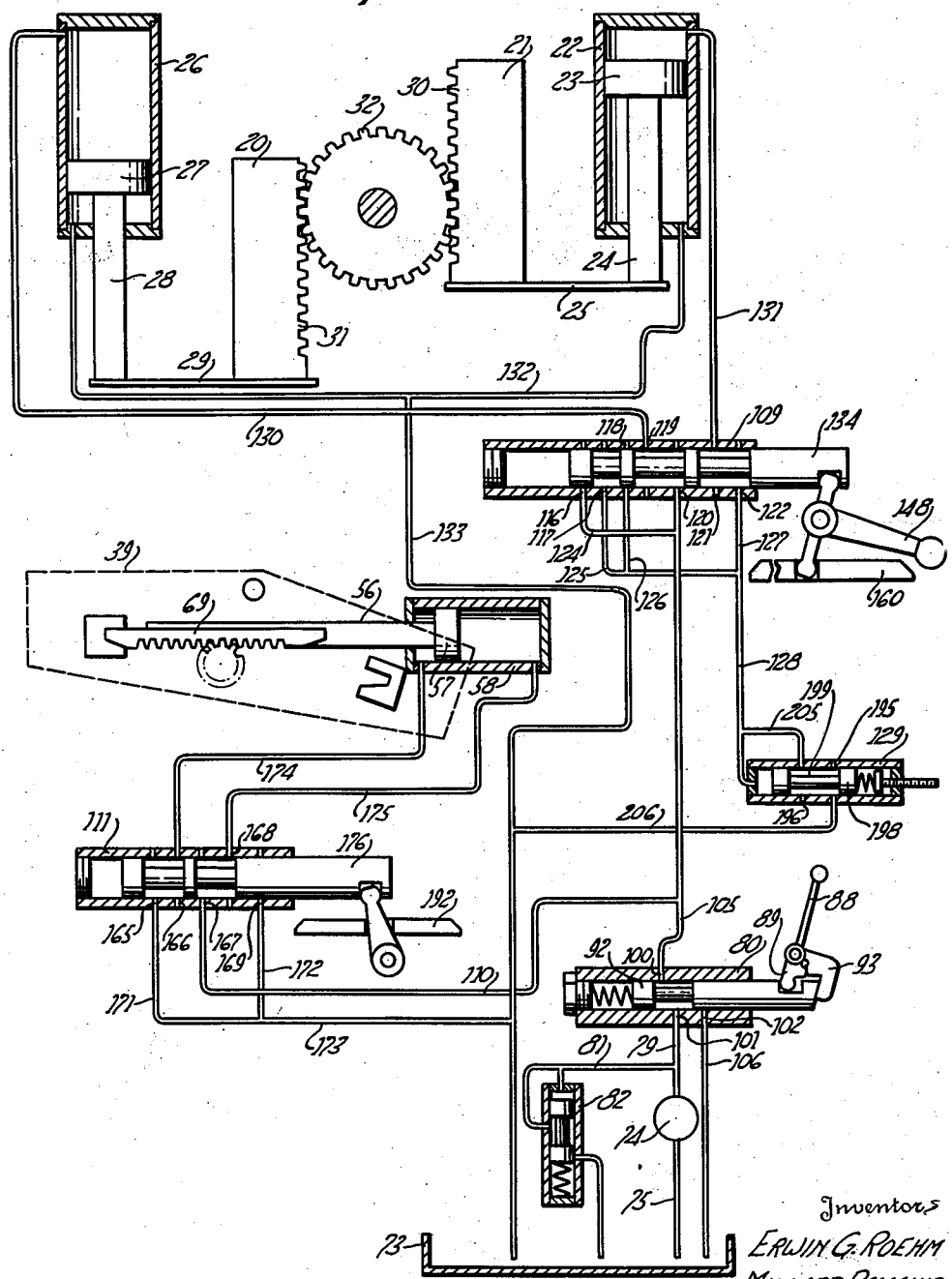
Inventors
ERWIN G. ROEHM
MILLARD ROMAINE
By 
Attorney Patented July 7, 1936

2,047,034

UNITED STATES PATENT OFFICE 2,047,034

BROACHING MACHINE

Erwin G. Roehm, Norwood, and Millard Romaine, Cincinnati, Ohio, assignors to The Cincinnati Milling Machine Co., Cincinnati, Ohio, a corporation of Ohio Application November 4, 1933, Serial No. 696,696

11 Claims. (Cl. 90—33)

This invention relates to improvements in machine tools and particularly to improvements in broaching machines.

An object of the invention is the provision of improved means for effecting and controlling the operation of the ram of the broach.

Another object of the invention is the provision of improved means for alternately presenting work pieces to the action of the broaching tools utilized with a double ram type of machine.

A further object of the invention is the provision of an improved broaching machine having a pair of broaching rams and an improved work presentation and supporting mechanism for alternately presenting the work to the rams in succession.

A still further object of this invention is the provision of automatic interlocking means for sequentially actuating the broach rams and work supporting and presentation means.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 4 is a fragmentary vertical, sectional view taken substantially on line 4—4 of Figure 1.

Figure 6 is an enlarged sectional view of certain portions of Figure 4 illustrating the emergency stop valve operating mechanism.

Figure 7 is a sectional view taken on line 7—7 of Figure 6.

Figure 8 is a view, partly in section and partly in elevation, illustrating the main control valves.

Figure 9 is a horizontal, sectional view through the ram and table control valves as seen substantially from line 9—9 on Figure 1.

Figure 10 is a fragmentary sectional view taken substantially on line 10—10 of Figure 8.

Figure 11 is a sectional view through a back pressure valve and forms a detail of the invention.

Figure 12 is a transverse sectional view through the chip conveying and discharge mechanism as seen from line 12—12 on Figure 1.

Figure 13 is a diagrammatic view illustrating the hydraulic circuit involved in the operation and control of the mechanism.

Throughout the several views of the drawings similar reference characters are employed to denote the same or similar parts.

Figure 1:
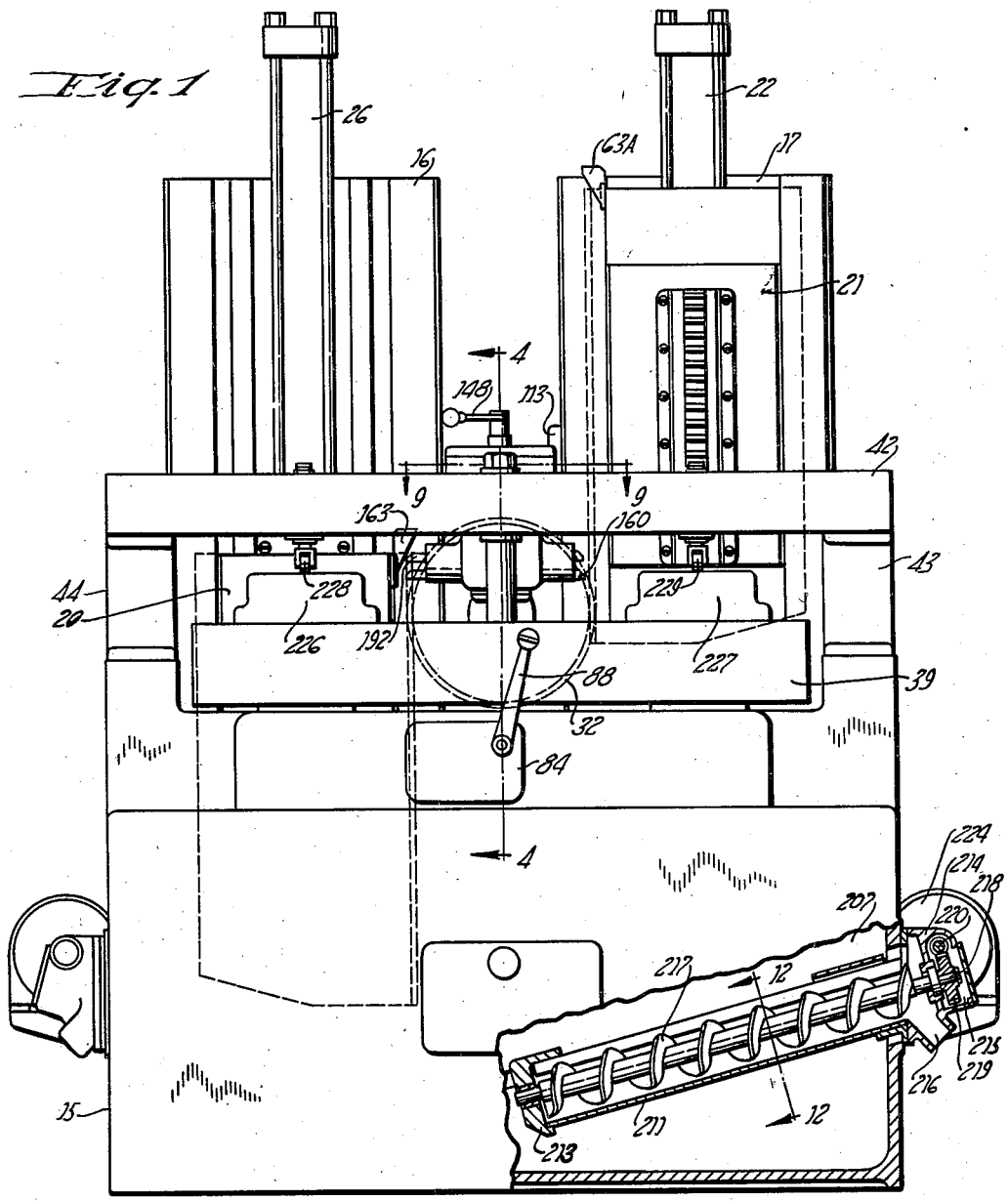
Figure 1 is a front elevation of the improved broaching machine embodying the improvements of this invention.

The broaching machine of the present invention comprises a main bed or base 15 from which rises at the rear thereof a pair of columns 16 and 17. The columns 16 and 17 are respectively provided on their forward faces with recesses 18 and 19 in which is respectively disposed broaching tool rams 20 and 21. The ram 21 is substantially U shaped to provide a passage in which is disposed a cylinder 22. The cylinder 22 is secured to the base of the recess 19 and encloses a piston 23, see Figure 13. The piston 23 has projecting therefrom a piston rod 24, the free end of which is connected by a strap or bracket 25 with the ram 21. The piston 23 is adapted to be reciprocated relative to the cylinder 22 by means of an hydraulic medium under pressure for correspondingly actuating the ram 21 as will later be described in detail.

The ram 20, similar to the ram 21, is substantially U shaped in cross section to provide a passage therethrough in which is disposed the cylinder 26. The cylinder 26, similar to the cylinder 22 is secured to the column 16 at the base of its recess 18. Enclosed within the cylinder 26 is a piston 27 having projecting therefrom a piston rod 28. The free end of the piston rod 28 is connected by a strap or bracket 29 with the ram 20. The piston 27, similar to the piston 23, is adapted to be reciprocated relative to its cylinder by the hydraulic medium under pressure for thereby correspondingly actuating the ram 20, as will later be made clear.

Figure 3:
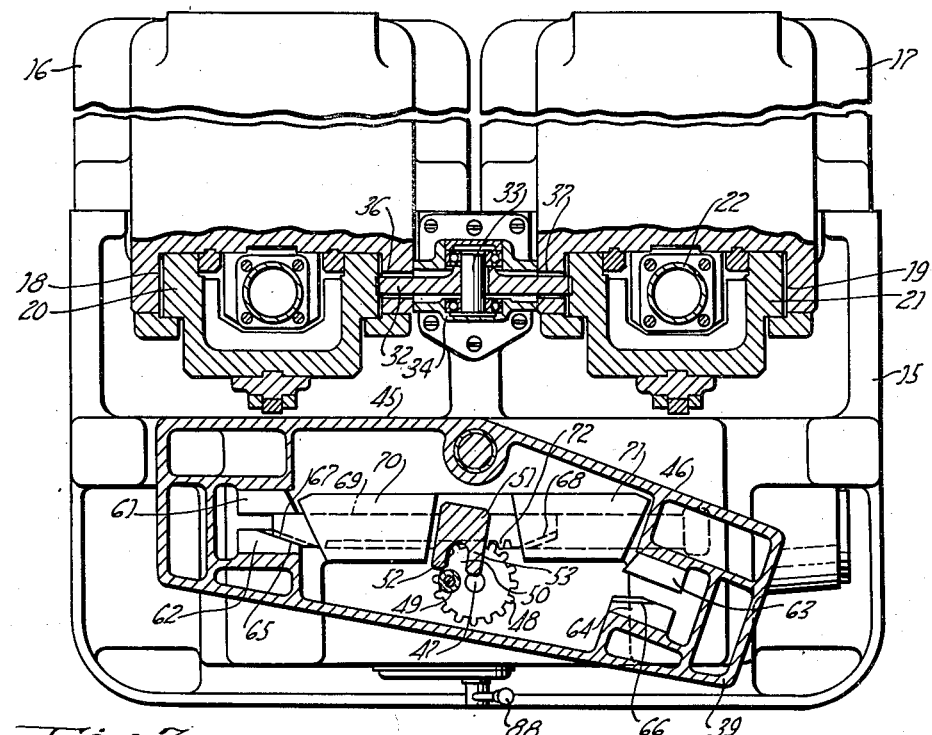
Figure 3 is a view partly in plan, and partly in horizontal section to show some of the internal construction of the machine.
Figure 5:
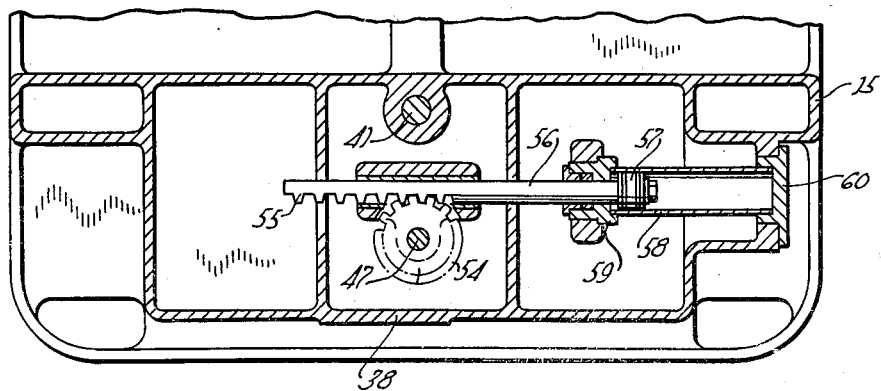
Figure 5 is a fragmentary horizontal, sectional view taken on line 5—5 of Figure 4.

The present invention contemplates the utilization of one of the rams 20 or 21 to effect the broaching cut, while the other ram is being returned idly to its normal or initial position. In order to keep the rams in proper relation to one another so that only one ram is effecting the cutting operation while the other is being returned they are mechanically connected. This mechanical connection comprises the provision of gear or rack teeth 30 on one side of the ram 21 and corresponding gear or rack teeth 31 on the opposed side of the ram 20. The said racks 30 and 31 are in simultaneous engagement at diametric points with the teeth of a large gear 32 rotatable about the axes of a stud or shaft 33 journaled in suitable bearings provided by a split bracket 34. The bracket 34 is secured to a web or projection 35 extending from the bed 15 and disposed substantially centrally to the space between the columns 16 and 17. In order to permit the racks 30 and 31 to engage with the gear 32 the adjacent walls of the column recesses 18 and 19 are respectively provided with openings 36 and 37 through which the gear projects, see Figure 3.

From the foregoing it will be seen that as one or the other of the rams 20 and 21 is being actuated downwardly to effect the broaching or cutting operation, the other ram will be correspondingly elevated.

In order to present the work alternately to the rams 20 and 21 the bed 15 has formed integral therewith or secured thereto a bracket or housing 38 supporting for oscillation relative thereto a work supporting table 39. The table 39 extends substantially the width of the machine and is provided substantially midway of its length with an aperture receiving the bearing portion 40 of a standard or pivot shaft 41. The pivot shaft 41 has its lower end disposed in a suitable bore or guide in the housing 38 and its upper end in a cross brace or beam 42 which overlies the table 39. The cross brace or beam 42 has its ends secured to uprights 43 and 44 carried by the bed 15. As will be seen in Figure 3 the oscillatable work table 39 is provided on its inner end with a pair of faces 45 and 46 disposed in angular relation to one another and adapted to respectively parallel with the rams 20 and 21 when presenting work pieces thereto.

In order to oscillate the table about the axis of the bearing 40 the housing 38 has journaled therein a shaft 47 carrying on its upper end a gear 48, in turn carrying eccentrically thereof a roller 49. The roller 49 is adapted to enter a slot 50 formed in an actuating member 51 secured to the under surface of the table 39. With the table 39 in a neutral position the axes of the pivot shaft 41, slot 50 of member 51, roller 49 and shaft 47 are in alignment whereby movement of the roller in either direction will correspondingly oscillate the table. This oscillation is effected by engagement of the roller 49 with the arms 52 and 53 of the member 51 as formed by the slot 50 therein.

In order to effect the rotation or oscillation of the shaft 47 and consequently the gear 48 and roller 49, the said shaft 47 has secured thereto intermediate its ends a second gear 54 meshing with a rack 55 integral with or secured to a piston rod 56. The piston rod 56 has secured to its other end a piston 57 enclosed within a cylinder 58 disposed within the housing 38. The ends of the cylinder 58 are respectively closed by suitable heads 59 and 60, the former including a suitable stuffing box to prevent leakage therethrough. The piston 57 is adapted to be actuated by a fluid under pressure as will be described in detail later.

The table 39 is adapted to be clamped or locked in each of its operative positions for which purpose the table has secured to its under-surface at opposite ends thereof clamping blocks 61—62 and 63—64. The clamping blocks 62 and 64 are respectively provided with tapered faces 65 and 66 co-operating with the wedges 67 and 68 formed at opposite ends of the clamping bar 69. The clamping bar 69 is disposed for axial movement in bearings 70 and 71 formed on the upper surface of the housing 38 and is provided intermediate the wedges with rack teeth 72 engaging the teeth of the gear 48.

The operation of the table actuating mechanism is as follows:

A certain amount of lost motion is provided between the roller 49 and the arms 52 and 53 of the member 51 so that a certain amount of oscillation or rotation is imparted thereto before engagement with the said rams. This lost motion permits the disengagement of the wedges 67 and 68 with their clamping blocks 62 and 64 before the table is actuated. From this it will follow that introduction of hydraulic pressure into one or the other ends of the table actuating cylinder 58 will effect the shifting of the piston 57 for first unclamping the table from the bed and then effecting the oscillation or indexing thereof to the second operative position. As soon as the table is indexed the wedge of the bar 69 engages with its clamping block for locking the table in its second operative position.

Figure 2:
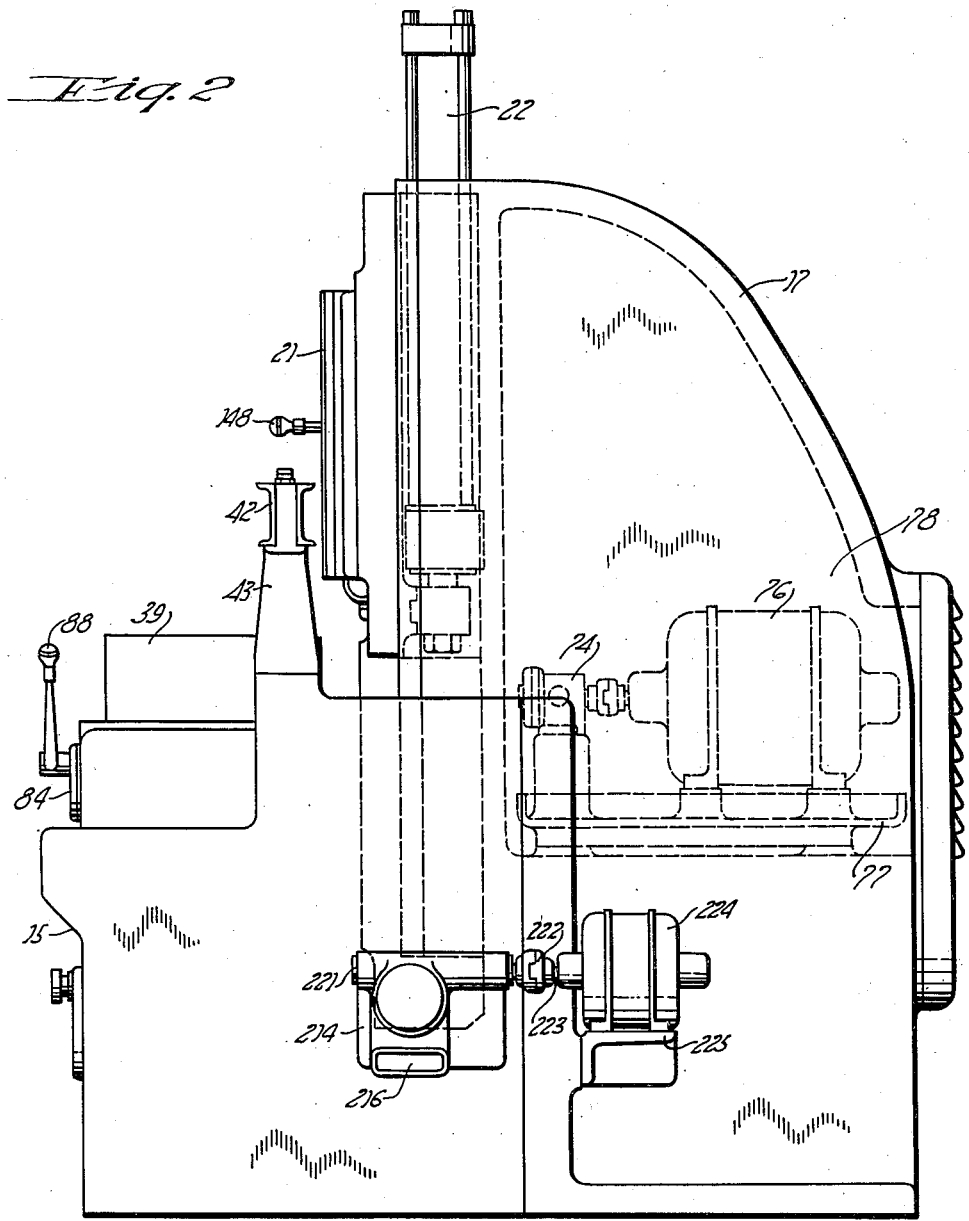
Figure 2 is a side elevation of the machine shown in Figure 1 as seen particularly from the right hand side thereof.

The hydraulic mechanism for effecting the operation of the ram pistons and table piston is illustrated in Figure 13. As there shown, this mechanism comprises a tank or sump 73 containing an hydraulic medium, preferably oil, which is circled through the system. Disposed above the tank 73 is a pump 74 having its suction side connected by a pipe 75 with the tank 73. The pump 74, see Figure 2, is adapted to be driven by a motor 76 and the said parts are carried by a plate 77 disposed within a compartment 78 formed in one of the columns, column 17 for example. The discharge side of the pump 74, see Figure 13, has extending therefrom a pipe or conduit 79 which terminates in a starting and stopping valve indicated generally by the numeral 80. The pipe or conduit 79 is connected through a pipe or conduit 81 with a relief valve 82 which in turn is connected with the tank or sump 73. The relief valve 82 determines the operating pressure in the system and returns the excess medium to the tank when this pressure is reached.

The valve 80 is shown structurally in Figures 6 and 7, and while it is a starting and a stopping valve, it also serves the function of an emergency stopping valve to short circuit the pump 79 directly to the tank 73 should an emergency arise. As shown in Figures 6 and 7 this valve comprises a housing 83 including a plate 84 whereby it is secured to the bed bracket housing 38 and having the valve itself disposed within the said housing 38. Oscillatably mounted in bearings 85 and 86 of the housing 83 is a shaft 87 extending through and beyond the plate 84 to receive a manual operating lever or handle 88. Secured to the shaft 87 intermediate the bearings 85 and 86 is a valve actuator 89 having its lower end 90 ball shaped and received in an enlarged notch 91 formed in the slidable valve 92. Loosely mounted on the shaft 87 is a latch 93 having a down turned finger 94 co-operating with the nose 95 on the valve 92 and is utilized for holding the valve 92 in its inner position of adjustment. In order to hold the latch 93 in its operative position it is spring loaded as by the spring 96. The latch 93 and valve shifter 89 are disposed in tandem relation to one another and respectively carry abutting lugs 97 and 98 whereby movement of the actuator 89 in a counter-clockwise direction effects the corresponding movement of the latch 93. It is for this reason that considerable lost motion is provided between the ball end 90 of the actuator 89 and the walls of the notch 91 so that the latch may be actuated to an inoperative position before the valve 92 itself is moved.

The valve 92 is provided intermediate its ends with a cannelure 99 for connecting in different combinations the radial ports 100, 101 and 102 formed through the valve sleeve 103 which encircles the valve 92. Each of the sets of radial ports is encircled on the exterior of the bushing 103 with a similar circumferential groove 104 and with said grooves are connected ends of pipes or conduits 105, 79 and 106. The pipe or conduit 79 connects with the ports 101 while connected with the ports 100 and 102 is respectively the pipes or conduits 105 and 106. In order to shift the valve 92 rapidly in the event of an emergency and when the latch 93 is released the bore through the bushing 103 is closed at one end by a plug 107 which forms one abutment for a spring 108 disposed within the bushing bore and abutting on its other end with the valve 92.

The pipe 106 is a return pipe and terminates in the sump or tank 73 while the pipe 105 terminates in the ram piston control valve indicated generally by the numeral 109. The said pipe 105 has extending therefrom a branch pipe or conduit 110 which terminates in the table control valve indicated generally by the numeral 111. The valves 109 and 111 are shown structurally in Figures 8 to 11 inclusive and are adapted to be manually and automatically actuated to effect and control the timed operation of the ram pistons and table piston. These valves and their control mechanism are carried by a single housing disposed within convenient reach of the operator within the space between the columns 16 and 17.

This valve mechanism, therefore, comprises a housing 112 having formed along one side thereof a flange 113, see Figure 1, whereby the housing is secured to the adjacent face of one of the columns. The housing 112 is provided with a pair of parallel bores respectively carrying valve bushings 114 and 115, the former being part of the valve 109, while the latter is a part of the valve 111.

The valve bushing 114 has formed therethrough a plurality of sets of radial ports 116, 117, 118, 119, 120, 121 and 122, each of which sets is encircled by a similar circumferential groove 123 formed in the exterior of the sleeve 114. It is with the ports 122 that the other end of the pipe or conduit 105 connects, while a branch conduit 124 from the conduit 105 connects with the ports 116. The ports 117, 118 and 120 are respectively connected with branch discharge conduits 125, 126 and 127, each emptying into a conduit 128 that terminates in back pressure valve indicated generally by the numeral 129. The ports 119 have connected therewith one end of a conduit 130 which terminates in the upper end of cylinder 26, while the ports 121 have connected therewith one end of a pipe or conduit 131 which terminates in the upper end of the cylinder 22. The lower ends of said cylinders 26 and 22 are connected together by a conduit or pipe 132 emptying into a discharge pipe or conduit 133 that terminates in the sump or tank 73.

Mounted for sliding movement within the valve bushing 114 is a spool type valve 134 having formed therein cannelures 135, 136 and 137, which in different positions of adjustment connect in different combinations the several sets of radial ports in the bushing. In order to shift the valve 134 it is provided on one end with a slot 138 receiving the ball end 139 of a valve shifter 140. The shifter 140 is keyed or otherwise secured to a shaft 141 rotatably or oscillatably journaled in bearings 142 and 143 provided by caps 144 and 145 secured to the housing 112. In addition the shaft 141 is journaled in a sleeve 146, in turn rotatably journaled in a bearing 147 of the housing 112. The shaft 141 extends through and beyond the bearing 142 and cap 144 to receive a manually actuable lever or handle 148 whereby the shaft 141 may be rotated or oscillated for correspondingly actuating the valve shifter 140.

The valve 134 is adapted to have three positions, namely, a neutral position and an operative position to the right and left of said neutral position. In order to determine the said positions of the valve, the valve shifter 140 is provided with a segmental flange or wing 149 having formed therein notches 150, 151 and 152 co-operating with the nose 153 of a detent 154. The detent 154 is pivotally connected to lugs or ears 155 projecting inwardly of the housing 112. In order to yieldably hold the detent nose 153 into engagement with the notches of the flange or wing 149 the housing 112 supports a plunger 156 yieldably urged toward the detent 154 for yieldably holding its nose in engagement with the periphery of the wing 149.

From the foregoing it will be noted that the valve 134 is manually actuated, which manual actuation is utilized for effecting the initial descent of the pistons 27 and 23 for which purpose the valve has an operative position on each side of its neutral or central position. In the operation of the machine the valve is adapted to be automatically shifted from the said operative positions to the neutral position. For this reason the shaft 141 carrying the valve shifter 140 has keyed or otherwise secured to it a finger 157 having its outer end 158 received in a notch 159 of a rod 160. The rod 160 is adapted to be axially reciprocated through bearings 161 and 162 formed on the opposite sides of valve housing 112. This shifting of the rod 160 to the right, as seen in Figure 9, is effected by a dog 163 secured in T slot 164 formed along the face of the ram 20. The dog is so positioned with respect to the ram and the valve that it engages with the rod when the broaching cut is substantially finished. Therefore, when the ram 20 is at its lower limit of travel, as will later be made clear, the valve 134 is shifted from a position which effects the downward movement of the ram 20 to its neutral position.

The valve bushing 115 of the table valve 111, similar to the valve bushing 114, is provided with a plurality of sets of radial ports 165, 166, 167, 168 and 169, each set being surrounded by a similar circumferential groove 170 formed in the exterior of the bushing 114. The ports 167 have connected therewith the branch pressure conduit 110 and the ports 165 and 169 have respectively connected therewith branch discharge conduits 171 and 172 which are in turn connected with a pipe or conduit 173 terminated in a main discharge conduit 133. Connected with the ports 166 is one end of a pipe or conduit 174 which terminates at the left hand end of the table cylinder 58 as seen in Figure 13, while the ports 168 have connected therewith one end of a pipe or conduit 175 which terminates in the right hand end of said table cylinder 58. Disposed within the bore in the bushing 115 is a spool type valve 176 having formed therein cannelures 177 and 178 adapted in different positions of adjustment to connect the several sets of radial ports for alternately connecting the pressure from the conduit 110 with either of the conduits 174 and 175 and connecting the remaining conduit with the sump.

The valve 176, therefore, has two operative positions and to effect the adjustment of the valve it is provided in its outer end with a notch 179 receiving the ball end 180 of a valve shifter member 181. In order to determine the operative positions of the valve 176 its actuator 181 is provided with a segmental radial flange 182 carrying notches 183 and 184 adapted to co-operate with the nose 185 of a detent 186. The detent 186, similar to the detent 154, is pivotally mounted on lugs or ears 187 projecting inwardly of the main housing 112. The nose 185 is yieldably held in engagement with the flange 182 of the valve shifter by a spring pressed plunger 188.

The valve actuator 181, and therefore the valve 176, are adapted to be power actuated by the movement of the rams, for which reason the said valve actuator 181, see Figure 8, is keyed or otherwise secured to the sleeve 146 which surrounds the shaft 141 above referred to. The sleeve 146 has secured to its lower end a finger 189, the free end 190 of which is received in a notch 191 formed in an axial shiftable rod 192. The rod 192, similar to the rod 160, is mounted for sliding movement in the bearings 161 and 162 projecting outwardly from the housing 112. This rod 192 is adapted to be engaged and shifted by the dog 163 at a point in the movement of the ram 20 slightly ahead of the shifting of the rod 160, wherefore it is disposed in a plane parallel with but above the plane of movement of the rod 190.

As will later be made clear, the discharge from the ram pistons 27 and 23 is through the conduit 128 which, as above noted, terminates in the back pressure valve 129. This valve is shown structurally in Figure 11 and comprises a housing 193 in which is pressed a bushing 194 having formed therethrough two sets of radial ports 195 and 196, each set being connected by a similar circumferential groove 197 formed in the exterior of the bushing 194. Disposed within the bore in the bushing 194 is a spool type valve 198 having formed therein a cannelure 199 which is adapted to connect the ports 195 and 196 when in one position and gradually cut down the flow between these ports as the valve 198 is moved. The valve 198 is moved in one direction by a spring 200 abutting on one end with the valve 198 and on the other end with an adjustable abutment 201 disposed within a housing 202 secured in one end of the bushing 194. The valve 198 is moved in the opposite direction or against the yielding resistance of the spring 200 by the hydraulic medium itself, for which purpose the other end of the bushing is closed by a plug 203 having formed centrally therethrough a port 204. It is with the port 204 that the conduit or pipe 128 connects, while a branch conduit or pipe 205 from this conduit 128 connects with the ports 196. The ports 195 have connected therewith one end of a conduit 206 which terminates in the main discharge conduit 133.

The valve 129, it will be noted, is alternatively connected through valve 134 with lines 130 or 131 depending on which at the time constitutes the return or discharge side of the system. It functions to maintain a constant resistance to the joint movement of pistons 23 and 27, thus preventing jumping of the ram, and thus the broach toward the work or a surging effect if work resistance is irregular. In its operation the back pressure or return flow through conduit 128 is directed against the left-hand end, as viewed in Figure 13, of the valve spool 198, urging it into open position against the action of the adjustable tension spring 200. This serves to effect a greater or lesser opening of the throttling action of the valve between branch conduit 205 of conduit 128 and conduit 206, thus maintaining a prescribed back pressure in 128 as determined by adjustment of spring 200 irrespective of the rate of discharge of actuating fluid through 128 and the valve to the sump.

The complete cycle of operation of the machine is as follows: the pump 74 is first started to effect circulation of the hydraulic medium. The start and stop valve 80 is then opened to connect the conduits 79 and 105, thereby causing a flow of the hydraulic medium in the conduit 105, under pressure, as well as a flow thereof through the conduit 110. The table valve 111 will be in the position for connecting the hydraulic medium to one or the other sides of the table operating piston. As shown in Figure 13, this medium is connected through the conduit 175 to the right hand end of the piston, thereby shifting the table into position for having the work thereon tooled by the broach associated with the ram 20. As further shown in Figure 13, the conduit 105 is connected with the conduit 130 thereby causing the descent of the ram 20. This downward movement of the ram 20 continues until the dog 163 thereon engages and effects the operation of the rods 192 and 160.

Since the rod 192 is disposed above the rod 160 it will first be actuated for shifting the valve 111 to its second position. This position will be to the left of that shown in Figure 13. At this time the branch pressure conduit 110 is connected with the conduit 174 thereby directing the pressure medium to the left hand side of the piston 57, and through mechanism above described, oscillating the table 39 in a counterclockwise direction to position the second work piece thereon in position to be broached by the tool carried by the ram 21. The valve 111 remains in either of its operative positions for thereby maintaining a pressure on the piston 57 to hold the table against any movement during the tooling operation.

Shortly after the shifting of the rod 192 the dog 163 engages and shifts the rod 160, thereby shifting the valve 109. This movement of the valve 109 is to a central position thereby stopping any flow through the conduits leading to the ram pistons. If the second work piece is now securely clamped and ready to be operated on by the broach tool of the ram 21 the lever 148 is manually engaged and the valve 109 shifted to its second operative position. This position is to the left of the position shown in Figure 13 and connects the medium in the conduit 105 with the conduit 131, thereby causing a descent of the piston 23 and ram 21. The descent of the piston 23 through the rack 30 thereof, gear 32 and rack 31 on the ram 20 effects the elevation or ascent of the ram 20 and consequently the elevation or ascent of the piston 27 associated therewith. As the piston 27 is elevated the hydraulic medium ahead of it is forced out through the conduit 130 and the conduits 126 and 128 to the back pressure valve 129 through which it flows, as above described, to the conduit 133 and sump or tank 73. Any fluid that may leak past the pistons 23 and 27 is drained from their respective cylinders 22 and 26 through the conduit 132 and conduit 133 to the sump or tank 73.

The descent of the piston 23 and ram 21 continues until the dog 63—A of the ram 21 engages with the rods 192 and 160, thereby shifting the valve 111 to the position shown in Figure 13 and again indexing or oscillating the table 39 and shifting the valve 109 to its neutral or central position. If now the new work piece is sufficiently clamped and ready to be operated upon the manual lever 148 is again grasped for shifting the valve 109 to the position shown in Figure 13, whereupon the piston 27 and ram 20 are actuated through a cutting stroke. During the descent of the piston 27, the piston 23 and ram 21, through the racks 30 and 31 and gear 32 is elevated thereby discharging the hydraulic medium on the upper side of the piston 23 through the conduits 131, 127 and 128 to and through the back pressure valve 129. Again, of course, any leakage past the pistons 27 and 23 is drained through the conduits 132 and 133 to the sump.

From the foregoing it is believed now evident that there has been provided a broaching machine having a reciprocating operative cycle whereby the machine is substantially continuously broaching. It should also be now evident that lost time heretofore consumed in idly returning the broach ram to its initial position and the idle time heretofore utilized in replacing work pieces has been reduced to an absolute minimum if not eliminated.

The bed 15 is provided beneath the broach rams 20 and 21 with chip receiving compartments, which are identical, and it is believed that a description of one of them will be sufficient for the both. Accordingly, this chip receiving compartment 207 is formed between vertically disposed walls or webs 207A and 208 interiorly of the bed 15. The walls 207 and 208 have projecting inwardly therethrough lugs or ledges 209 and 210, supporting an arcuate shaped trough 211. This trough 211 is closed at one end by a casting 213 having formed therethrough a central aperture and is closed at the upper end by the casting 214. The casting 214 is likewise provided with a central aperture and in addition is provided with a gear housing 215 and a discharge nozzle 216. Rotatably journaled in the central apertures of the castings 213 and 214 is a conveyor screw 217 having projecting from its outer end a reduced portion 218 which extends into the gear housing 215. Secured to said projection 218 of the conveyor screw 217 is a worm wheel 219 meshing with a worm 220 integral with or secured to a worm shaft 221 connected through a coupling 222 with the shaft 223 of a motor 224. The motor 224 is supported by a bracket 225 secured to the rear of the bed 15 or the face of the column 17.

From the foregoing it will be seen that as the slides or rams 20 and 21 are actuated downwardly they effect the removal of chips from the work on the table 39, which chips are discharged into the chip compartments 207. The said chips are then received in the trough 211 and engaged by the lands of the conveyor screw 217 and worked upwardly therethrough to the discharge nozzle 216. The chips, upon being discharged through the nozzle 216, are received in suitable receptacles placed outside of the machine beneath the nozzle for this purpose.

In order to properly present the work pieces to the broaching tools the table 39 is provided at opposite ends thereof with suitable work holding fixtures 226 and 227. Co-operating with each of the work holding fixtures 226 and 227 respectively is pressure or clamping rollers 228 and 229 carried by the cross brace or overlying member 42. From this it will be seen that the work pieces are readily secured to the surface of the table for operation thereon by the broach tools.

It is believed that the foregoing clearly discloses the structure and operation of the improved broach of the present invention.

What is claimed is:

1. In a broaching machine of the class described the combination with a pair of reciprocating rams operable in opposite directions through a cutting and an idle stroke, of mechanical means connecting said rams whereby when one ram is operated through its cutting stroke the second ram is returning through its idle stroke, hydraulic means for effecting the cutting stroke of each ram, an oscillatable work supporting table adapted to present a work piece to each ram when traveling through its cutting stroke, hydraulic means for effecting the oscillation of the table, an hydraulic circuit including an hydraulic medium under pressure for actuating the rams and table hydraulic means, a pair of control valves in said circuit, one for controlling the movement of the rams and the other for controlling the oscillation of the table, and means for actuating said valves in sequence whereby the movement of the table is initiated during the ram stroke whereupon the movement of the rams is stopped.

2. In a broaching machine of the class described the combination with a pair of reciprocating rams operable in opposite directions through a cutting and an idle stroke, of mechanical means connecting said rams whereby when one ram is operated through its cutting stroke the second ram is returning through its idle stroke, hydraulic means for effecting the cutting stroke of each ram, an oscillatable work supporting table adapted to present a work piece to each ram when traveling through its cutting stroke, hydraulic means for effecting the oscillation of the table, an hydraulic circuit including an hydraulic medium under pressure for actuating the ling the oscillation of the table, means for actuating rams and table hydraulic means, a pair of control valves in said circuit, one for controlling the movement of the rams and the other for controlling the oscillation of the table, means for actuating said valves in sequence whereby the movement of the table is initiated during the ram stroke whereupon the movement of the rams is stopped, and manual means for actuating the rams control valve to initiate the movement thereof.

3. In a broaching machine of the class described the combination with a bed, a pair of broach rams reciprocable relative thereto in opposite directions through a cutting stroke and a reverse idle stroke, and mechanical means for connecting said rams whereby the movement of one ram through its cutting stroke effects the movement of the second ram through its idle stroke, of an hydraulic motor associated with each ram for effecting its movement through the cutting stroke, an oscillatable work supporting table for alternately presenting work pieces to the rams when they are passing through their cutting stroke, an hydraulic motor for effecting the operation of the oscillatable work supporting table, and means for sequentially operating the ram and table hydraulic motors.

4. In a broaching machine of the class described the combination with a bed, a pair of broach rams reciprocable relative thereto in opposite directions through a cutting stroke and a reverse idle stroke, and mechanical means for connecting said rams whereby the movement of one ram through its cutting stroke effects the movement of the second ram through its idle stroke, of an hydraulic motor associated with each ram for effecting its movement through the cutting stroke, an oscillatable work supporting table for alternately presenting work pieces to the rams prior to the commencement of their cutting stroke, an hydraulic motor for effecting the operation of the oscillatable work supporting table, means for sequentially operating the ram and table hydraulic motors, including an hydraulic circuit, a valve in said circuit for controlling the oscillation of the table, a second valve in said circuit for controlling the alternate movement of the ram motors, and co-operating means associated with the valves and rams whereby the table valve and ram valve are operated in succession to effect first an oscillation of the table and then a cessation in the movement of the rams.

5. In a broaching machine of the class described the combination with a bed, a pair of broach rams reciprocable relative thereto in opposite directions through a cutting stroke and a reverse idle stroke, and mechanical means for connecting said rams whereby the movement of one ram through its cutting stroke effects the movement of the second ram through its idle stroke, of an hydraulic motor associated with each ram for effecting its movement through the cutting stroke, an oscillatable work supporting table for alternately presenting work pieces to the rams prior to the commencement of their cutting stroke, an hydraulic motor for effecting the operation of the oscillatable work supporting table, means for sequentially operating the ram and table hydraulic motors, including an hydraulic circuit, a valve in said circuit for controlling the oscillation of the table, a second valve in said circuit for controlling the alternate movement of the ram motors, co-operating means associated with the valves and rams whereby the table valve and ram valve are operated in succession to effect first an oscillation of the table and then a cessation in the movement of the rams, and means for further shifting the ram valve to initiate the movement thereof.

6. In a broaching machine of the class described the combination of a bed having rising thereabove a pair of columns, a broach ram associated with each column for reciprocation relative thereto, an oscillatable work supporting table mounted on the bed for alternately presenting work pieces to the action of said rams, chip receiving compartments formed in said bed immediately beneath each ram and adapted respectively to receive the chips produced by each ram, each compartment being formed between vertical walls disposed within the bed and each wall having projecting therefrom a lug, a trough supported by said lugs between the walls and adapted to receive the chips, and independent means in each compartment for ejecting the chips from its trough.

7. In a broaching machine of the class described the combination of a bed having rising thereabove a pair of columns, a broach ram associated with each column for reciprocation relative thereto, an oscillatable work supporting table mounted on the bed for alternately presenting work pieces to the action of said rams, chip receiving compartments formed in said bed immediately beneath each ram and adapted respectively to receive the chips produced by each ram, each compartment being formed between vertical walls disposed within the bed and each wall having projecting therefrom a lug, a trough supported by said lugs between the walls and adapted to receive the chips, and independent means in each compartment for ejecting the chips from its trough, said means including a conveyor screw in each trough, a discharge nozzle at one end of each trough, and an independent prime mover for rotating each conveyor screw.

8. A vertical hydraulic broach including a bed, a main drive motor supported by the bed, a pair of columns rising from the bed and provided with ram receiving ways, hydraulic cylinders carried by the columns adjacent the ways, broach supporting rams mounted on the ways and operatively coupled with the hydraulic cylinders, an hydraulic actuating system contained within the bed and coupled with the cylinders, said system including an hydraulic pump driven by the motor, conduits extending from the pump to the upper ends of the cylinders for introducing pressure fluid thereinto, valve means for selectively directing the pressure fluid to the upper portion of either of said cylinders, rack bars carried by the rams, and an intermediate gear member meshing with both said rack bars whereby hydraulic pressure introduced into the top of either of the cylinders effecting downward movement of its ram will, through the rack bars and gear, effect a lifting of the opposite ram.

9. A duplex vertical metal broaching machine including a bed having a pair of spaced columns rising therefrom each provided with guiding ways, a vertically movable broach ram slidably engaged upon the ways of each column, an hydraulic piston and cylinder mechanism individual to each of said column and ram structures, an hydraulic pressure system including a common pressure line and a pair of pressure lines individual to the respective cylinders for introduction of pressure fluid into the upper portion thereof, a selector valve for selectively directing the pressure fluid from the pressure line to either of said cylinders, the broach rams having the proximate faces thereof formed with rack teeth, a bracket member carried by the bed and a gear member journaled in the bracket and jointly meshing with the opposed rack surfaces of the two rams whereby hydraulic depression of either ram to effect a broaching operation will react through the gear to retract the opposite ram into elevated position.

10. A duplex vertical metal broaching machine including a bed having a pair of spaced columns rising therefrom each provided with guiding ways, a vertically movable broach ram slidably engaged upon the ways of each column, an hydraulic piston and cylinder mechanism individual to each of said column and ram structures, an hydraulic pressure system including a common pressure line and a pair of pressure lines individual to the respective cylinders for introduction of pressure fluid into the upper portion thereof, a selector valve for selectively directing the pressure fluid from the pressure line to either of said cylinders, the broach rams having the proximate faces thereof formed with rack teeth, a bracket member carried by the bed and a gear member journaled in the bracket and jointly meshing with the opposed rack surfaces of the two rams whereby hydraulic depression of either ram to effect a broaching operation will react through the gear to retract the opposite ram into elevated position, an hydraulic pressure return line, a pressure control throttle valve disposed in the return line, and means for selectively coupling the upper portion of either of the ram cylinders with said return line by way of the pressure controlled throttle valve whereby a predetermined resistance to ram elevation is provided.

11. A broaching machine including a bed or support, a column rising therefrom, an hydraulic piston and cylinder mechanism carried by the column, a ram member slidable on the column, means connecting the ram with the piston for uni-directional actuation thereby, said ram having a lateral rack portion formed thereon, means on the column backing up the rack portion of the ram to prevent lateral displacement thereof, and a driving member engaging the rack portion of the ram for effecting elevation of the ram during the non-tooling stroke thereof.

ERWIN G. ROEHM.
MILLARD ROMAINE.

CERTIFICATE OF CORRECTION.

Patent No. 2,047,034.                                              July 7, 1936.

ERWIN G. ROEHM, ET AL.

It is hereby certified that error appears in the printed specification of the above numbered patent requiring correction as follows: Page 5, second column, line 48, claim 2, strike out the syllable and words "ling the oscillation of the table, means for actuat-"; and that the said Letters Patent should be read with this correction therein that the same may conform to the record of the case in the Patent Office.

Signed and sealed this 29th day of September, A. D. 1936.

(Seal)
Henry Van Arsdale
Acting Commissioner of Patents.